Patented June 24, 1924.

1,499,249

UNITED STATES PATENT OFFICE.

HARRY OUSTAYAN, OF NEW YORK, N. Y., ASSIGNOR OF ONE-FOURTH TO ARDASH HACHIKIAN, OF NEW YORK, N. Y.

MEDICINAL COMBUSTIBLE FOR SMOKE TREATMENT.

No Drawing. Application filed June 27, 1921, Serial No. 480,643. Renewed April 19, 1924.

*To all whom it may concern:*

Be it known that I, HARRY OUSTAYAN, a citizen of the United States, and resident of 673 Columbus Ave., New York city, in the county of New York and State of New York, have invented certain new and useful Improvements in Medicinal Combustible for Smoke Treatment, of which the following is a specification.

The present invention relates to a medicinal compound for treating blood diseases including venereal diseases, such as syphilis.

The treatment of such diseases in accordance with the present invention embraces smoking the affected portions of the body with the smoke produced by burning pastiles or other shaped articles containing mercury compounds, metallic mercury and organic matter. The smoke from the burning of such pastiles (or composition) may also be inhaled to treat the mucous membranes when affected with syphilitic sores or syphilitic pimples, such as are common. For burning large masses of the material, it may be placed upon burning charcoal or the like, while for burning small portions as for inhalation, the material may be mixed with tobacco or like material, rolled into a cigarette and smoked.

The preferred composition, which has given very satisfying results is as follows:

15 parts of pure metallic mercury.
6 parts of fatty material, (such as 2 parts of animal fat, 2 parts of butter and 2 parts of almond oil).
3 parts of white wax.
1 part of glycerine.
5 parts of cinnabar (red sulphide of mercury).
5 parts of potassium permanganate.
10 parts of oak galls (dried and ground).
10 parts of pomegranate skin (dried and ground).
15 parts of henna.
15 parts of sarsaparilla root (dried and ground).

To the above may also be added a binder such as ½ part of gum arabic.

This mixture can be made up into tablets or pastiles of about the size of a five cent piece.

The amount to be used for burning for the treatment of a particular case will naturally depend upon the condition of the case and the age of the person treated. About 2½ of these tablets are burned for treating the boy of say 10 to 13 years; 3½ tablets for the boy of say 13 to 16 years, and somewhat more when treating adults.

When using the material for producing smoke for inhalation, the binder may be omitted.

In conjunction with the above and particularly in aggravated cases, as where the disease has advanced considerably, it is advisable to administer mercurial pills internally, in conjunction with the smoke treatment above referred to.

I claim—

1. A medicinal compound of a combustible nature containing metallic mercury, and vegetable matter functioning to give the compound consistency and burning qualities.

2. A medicinal compound containing metallic mercury, henna, dried galls and pomegranate peel, the organic matter therein functioning to give the compound consistency and burning qualities.

3. A medicinal compound suitable for the treatment of venereal diseases containing metallic mercury, a fatty and waxy vehicle therefor and dry organic matter, the dry organic matter being in amount sufficient to give the mass, when in the dry state, burning qualities.

4. A composition of matter adapted for use in the treatment of venereal diseases, containing about 15 parts of metallic mercury, about 6 parts of fatty to oily material, about 3 parts of wax, and about 1 part of glycerin, such composition containing organic matter in amount sufficient to enable the same to burn readily when placed upon glowing charcoal.

5. A composition of matter in the form of a dry solid coherent mass containing the following ingredients, in approximately the proportions stated, namely, 15 parts of mercury, 6 parts of fatty to oily material, 3 parts of wax, 1 part of glycerin, 5 parts of cinnabar, 5 parts of potassium permanganate, and 10 parts of oak gall, 10 parts of pomegranate skin, 15 parts of henna, and 15 parts of sarsaparilla root.

Signed at New York, in the county of New York and State of New York, this 23 day of June A. D. 1921.

HARRY OUSTAYAN.